Aug. 23, 1938.     G. R. MILTON     2,127,828
WELDING CLAMP
Filed Dec. 28, 1935     2 Sheets-Sheet 1
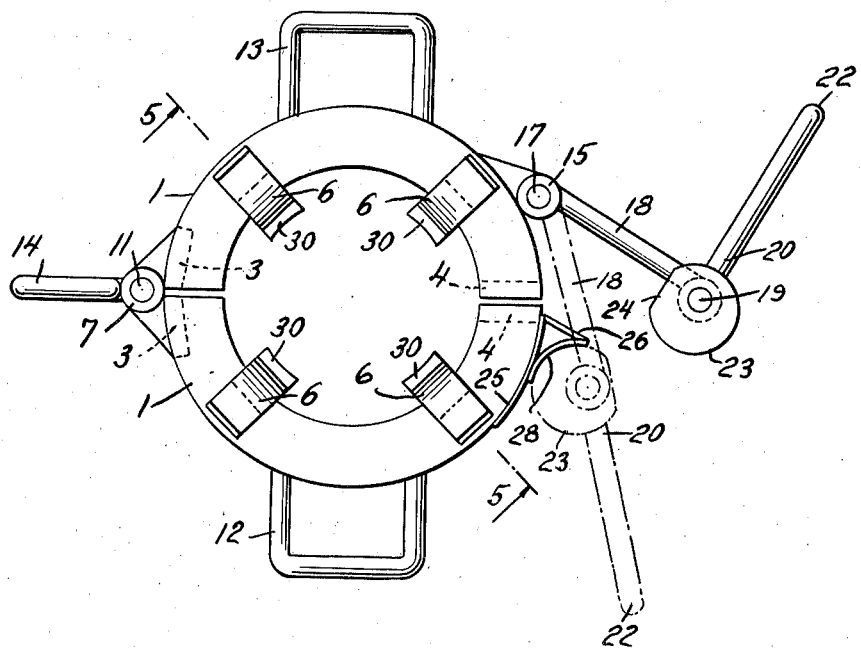
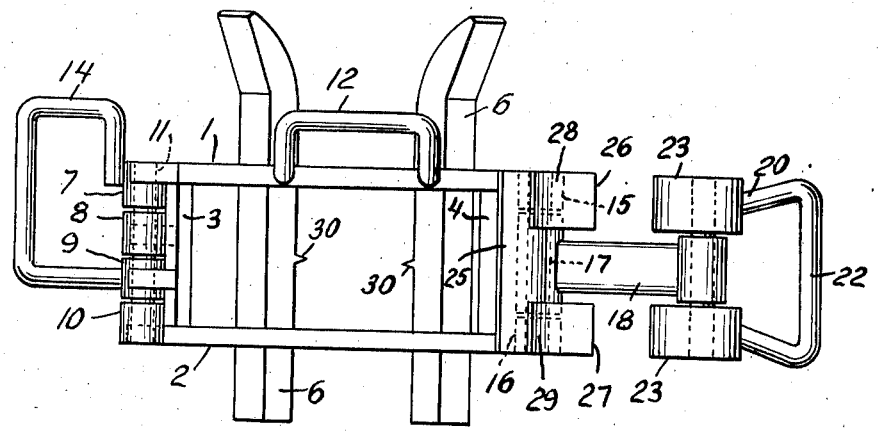
INVENTOR
George R. Milton
BY
Pennie, Davis, Marvin + Edmonds
ATTORNEYS Aug. 23, 1938.　　　G. R. MILTON　　　2,127,828
WELDING CLAMP
Filed Dec. 28, 1935　　　2 Sheets-Sheet 2
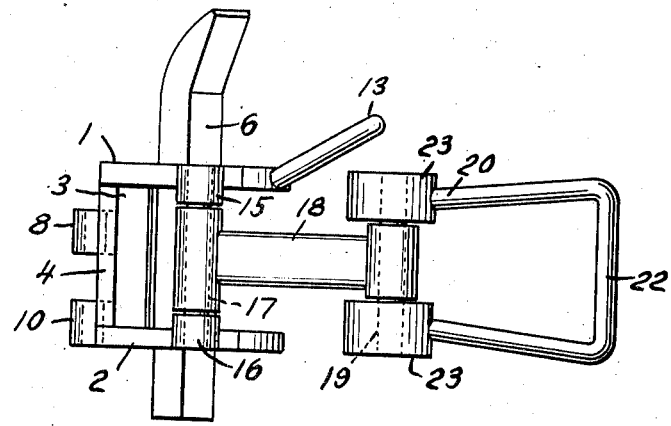
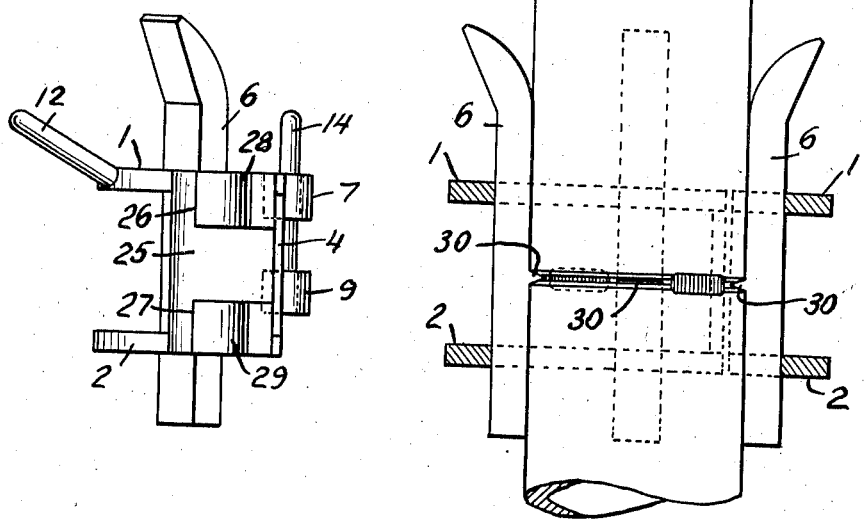
INVENTOR
George R. Milton
BY
Pennie, Davis, Marvin & Edmonds
ATTORNEYS Patented Aug. 23, 1938

2,127,828

UNITED STATES PATENT OFFICE 2,127,828

WELDING CLAMP

George Robert Milton, Arp, Tex., assignor to Sinclair Prairie Oil Company, Tulsa, Okla., a corporation of Maine Application December 28, 1935, Serial No. 56,524

1 Claim. (Cl. 113—102)

This invention relates to improvements in apparatus for aligning, spacing and rigidly holding, for welding, tubular casings or pipes. The apparatus of the present invention is of special advantage and utility in conjunction with the welding of vertical sections of oil well casings. However, it also is of general utility in accurately aligning and properly spacing, for welding, any pipes or casings of relatively large diameter.

In welding pipes or casings of relatively large diameter, alignment and spacing are of great importance as speed, economy and weld quality are directly influenced by the accuracy with which the joints are aligned and spaced. In normal welding practice for butt welding sections of pipe, the adjacent ends to be joined are beveled and the pipe sections then are aligned and positioned with the ends to be joined spaced apart a short distance which varies slightly with the thickness of the metal. The adjacent ends of the pipes or casing sections then are tack-welded at a number of separated points to maintain the desired alignment and spacing, and the weld then is completed. Various forms of clamps or jigs for holding pipe sections in position for welding have been proposed but they have not proved entirely satisfactory due primarily to the time and effort required in applying them in such a manner as to secure both the desired alignment and spacing. The present invention provides a jig or clamp that is adapted accurately to align two sections of pipe and properly space them for welding in a single operation.

The invention will be further described with reference to the accompanying drawings which illustrate one embodiment of the invention. Other advantages of the invention will be apparent from this further description.

In the accompanying drawings Fig. 1 is a plan view of one form of jig or clamp embodying the invention. Fig. 2 is an elevation of the apparatus shown in Fig. 1. Figs. 3 and 4, respectively, are elevations in profile of the separated upper and lower halves of the jig shown in Fig. 1. Fig. 5 is a fragmentary sectional view along the line 5—5 of Fig. 1 illustrating the manner in which the aligning bars engage, align and space the adjacent ends of two sections of pipe.

The device shown in the accompanying drawings comprise a sectional annular band consisting of two semi-annular sections hinged together at one side and provided with a clamping mechanism adapted to engage and firmly hold the sections together on the other side. Each of the semi-annular sections comprises two ring sections 1 and 2 rigidly secured in longitudinally spaced relationship by attachment to the spacing bars 3 and 4 and to the circumferentially spaced longitudinal aligning bars 6. To one end of the section of the annular band, shown as the upper half in Fig. 1, and separately in profile in Fig. 3, are attached, as by welding, the hinge members 8 and 10. The hinge members 8 and 10 are spaced for alternate registry and alignment with the hinge members 7 and 9 which are similarly attached to the corresponding end of the other end of the annular band. A pin 11 extends through the hinge members 7, 8, 9 and 10 and advantageously is attached to one of them, hinge member 10, for example, as by welding. Suitable handles 12, 13 and 14 also are provided.

Spaced from the end of the semi-annular section opposite that at which the hinge members 8 and 10 are mounted, are two additional hinge members 15 and 16. The hinge members 15 and 16 are suitably attached, as by welding, to the ring sections 1 and 2, respectively. A pin 17 extends through the hinge members 15 and 16 and through one end of the link 18. Pin 19 extends through the other end of the link 18 and through the end portions of a clevis-like member 20. The clevis-like member 20 comprises a handle portion 22 which is bent to the general configuration of a U, the open ends terminating in generally cylindrical co-axial portions 23 which are pierced by an eccentric bore through which the pin 19 extends. The generally cylindrical end portions advantageously are faced off on the side nearest to the eccentric bore as shown in Fig. 1 at 24. Adjacent the end of the semi-annular section opposite that at which the hinge members 7 and 9 are mounted is an engaging member comprising a plate 25 and two projections 26 and 27. The plate 25 extends from the upper edge of the ring section 1 to the lower edge of the ring section 2 so as to form a more rigid base for attachment of the projections 26 and 27. The projections 26 and 27 are spaced apart to permit the link 18 to pass between them. The faces 28 and 29 of the projections 26 and 27, respectively, are bent in the form of an arc having the same radius as the end portions 23 of the clevis-like member 20. The aligning bars 6 are flared outwardly at one end and a transverse tapered spacing projection 30 extends across the inner face of each of the aligning bars at a point approximately midway between the ring sections 1 and 2.

In using the device illustrated in the drawings for aligning and spacing vertical sections of oil well casing, for example, the semi-annular sections are placed around the upper portion of the lower casing section and the cylindrical end portions of the clevis-like member 20 are brought into engagement with the faces 28 and 29 of the projections 26 and 27 so that the inner faces of the lower portions of the aligning bars 6 will press lightly against the outer surface of the casing and the tapered spacing projections will rest upon the upper end of the lower casing section. The lower end of the upper casing section then is lowered between the aligning bars until its lower end rests upon the tapered spacing projections 30. The flared, upwardly extending ends of the aligning bars 6 assist in bringing the ends of the casing sections into approximate alignment. The eccentrically bored end portions of the member 20 are then rotated by the handle 22, thereby drawing the semi-annular sections toward each other. This causes the aligning bars 6 firmly to engage the outer surface of the end portions of the casing sections thereby bringing them and holding them in proper alignment. At the same time the tapered spacing projections are forced in between the adjacent ends of the casing sections so that they will be properly spaced for welding as shown in Fig. 5. The ends of the casing sections then may be joined by tack welds made through the openings between the ring sections 1 and 2 and the aligning bars 6. As soon as a number of tack welds, sufficient to maintain the proper alignment and spacing of the casing sections, have been made, the jig may be removed and the weld completed.

I claim:

A device for holding tubular casings or pipes in aligned relation for welding, comprising a pair of arcuate members, each comprising upper and lower, longitudinally-spaced, circumferentially-extending ring sections and longitudinally-extending circumferentially-spaced connecting members rigidly secured to said ring sections, a hinge connection between said arcuate members at one side, means for clamping the other sides of said members firmly together and about a casing or pipe, circumferentially-spaced, longitudinally-extending centering and aligning bars, each having at least a portion thereof extending inwardly of said ring sections, the ends of said aligning bars at one side of the device projecting longitudinally beyond their adjacent ring section and being flared outwardly to provide inwardly-converging surfaces for guiding a pipe into said device after said device has been secured about another pipe, and inwardly-directed tapered projections extending across the inner side of said aligning bars and positioned between said ring sections for slightly spacing adjacent ends of casing or pipes clamped in said device.

GEORGE ROBERT MILTON.